Nov. 21, 1933.  A. P. THURSTON  1,936,179
AIRCRAFT
Filed Dec. 31, 1931
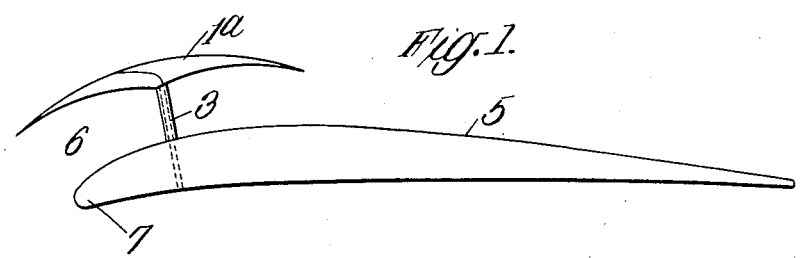
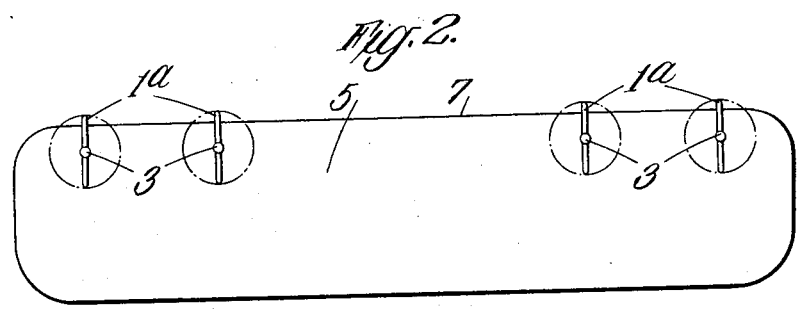
Albert Peter Thurston
INVENTOR Patented Nov. 21, 1933

1,936,179

UNITED STATES PATENT OFFICE 1,936,179

AIRCRAFT

Albert Peter Thurston, London, England

Application December 31, 1931, Serial No. 584,033, and in Great Britain April 13, 1931

2 Claims. (Cl. 244—12)

This invention relates to aircraft having in association with the upper surface of a fixed wing or the like one or more supporting or controlling surfaces adapted to rotate about an axis transverse to the direction of flight, such as rotary alulas as set forth in British Patent No. 331,283, dated April 6, 1929.

It is well known that, as compared with a flat plane-like element, any element acting as a lifting or supporting aerofoil has a greater lifting effect in given conditions if its upper or upper and lower surfaces is or are cambered, because it acts more efficiently in giving a downward momentum to the air passing over it.

According to the present invention aircraft as above described is provided with one or more rotary alulas or like rotary devices comprising blades which are curved bodily downwards along their length from their roots to their tips. Thus when the said rotary alula or the like is moving transversely to its axis of rotation during flight of the aircraft air is deflected downwardly by its longitudinal motion along the blades in addition to downward deflection due to rotation of the blades.

Referring to the accompanying diagrammatic drawing,

Figure 1 is a side view showing the invention applied to a rotary alula or rider plane in association with an aeroplane wing.

Figure 2 is a diagrammatic plan of an aeroplane wing.

Referring to Figure 1, the cambered rotor 1a is mounted upon the upper surface of the wing 5 so that its cambered disc of rotation forms with the nose 7 of the said wing a backwardly and upwardly sloping gap or "slot" 6. A plurality of rotors 1 may be employed along the top surface of the wing, as shown in Figure 2. Such rotors may be mounted upon the wing by any of the various means described in the said prior patent, and the upper surface of the wing may if necessary be formed with faired off projections in the transverse or longitudinal direction to accommodate the shape of the under portion of the rotor when nesting upon the plane.

The speed of rotation of the rotary devices will depend upon the pitch and shape of the blades. If a high speed is desired, when such devices are used as an antistalling device for the wings of aeroplanes, the outer portions of the blades are formed with little or no pitch. In this case the rotor is driven by the centre portion of the blades.

I claim:

1. Aircraft having in association with the upper surface of a fixed wing or the like one or more rotary alulas adapted to rotate about an axis transverse to the direction of flight, the blades of the said devices being curved downwards along their length from their roots towards their tips.

2. A rotary alula, as claimed in claim 1, combined with an aeroplane wing in such a way that when rotation takes place, the trace swept out by the blades forms a gap or "slot" with the nose of the said wing or the like.

ALBERT PETER THURSTON.